May 16, 1967 G. G. OLSON ETAL 3,320,424
PHOTOSENSITIVE OPTICAL ANGLE TRACKER
Filed Nov. 21, 1963 2 Sheets-Sheet 1
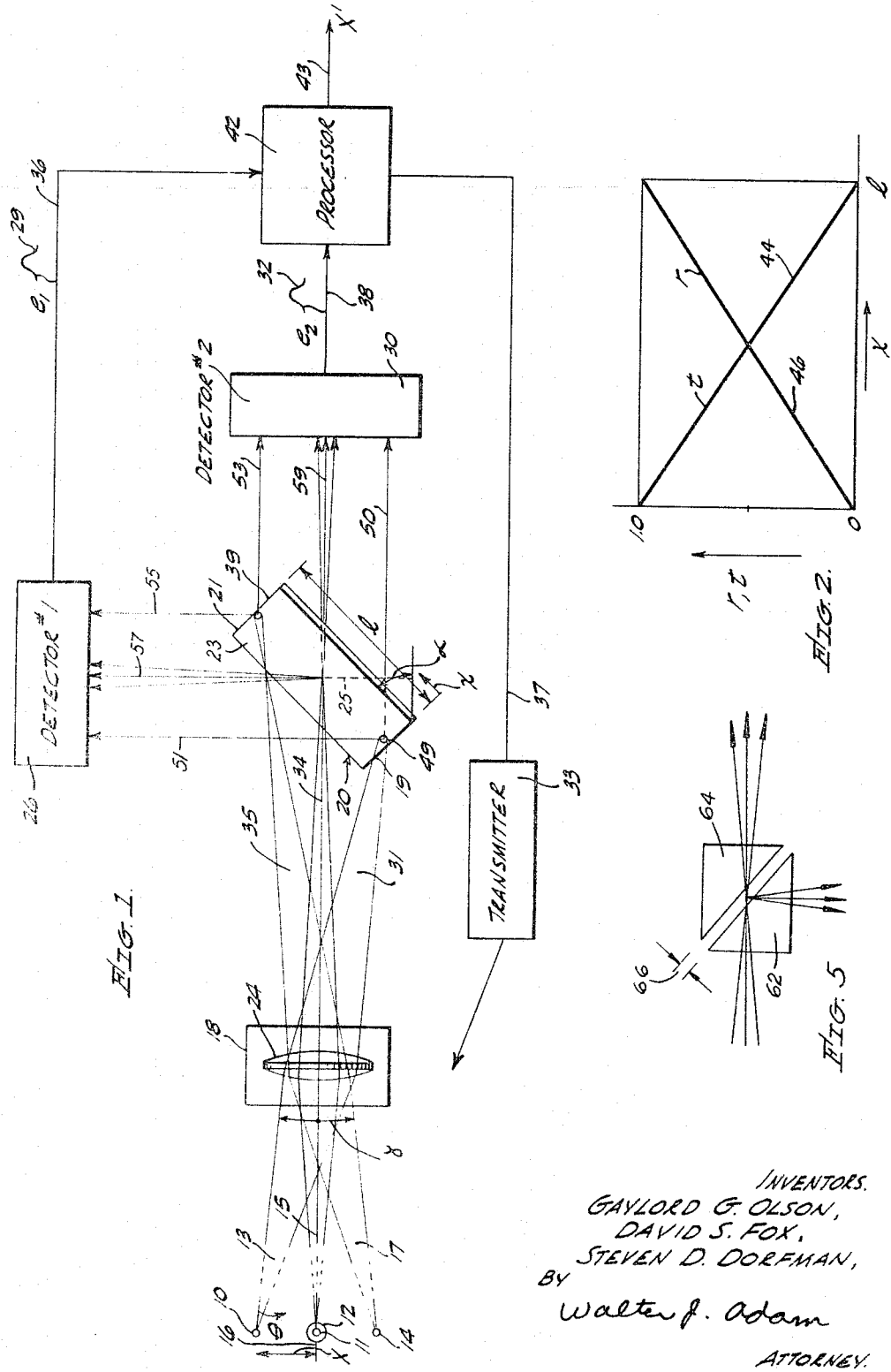

United States Patent Office 3,320,424
Patented May 16, 1967

3,320,424
PHOTOSENSITIVE OPTICAL ANGLE
TRACKER
Gaylord Gene Olson, Inglewood, Calif., David S. Fox, Tucson, Ariz., and Steven D. Dorfman, Santa Monica, Calif., assignors to Hughes Aircraft Company, Culver City, Calif., a corporation of Delaware
Filed Nov. 21, 1963, Ser. No. 325,278
5 Claims. (Cl. 250—203)

This invention relates to angle determining devices and particularly to an angle tracking system for responding to optical energy received from objects being tracked.

Angle tracking of objects in the atmosphere or in space is often performed by radar systems which necessarily include relatively complex microwave arrangements. Radar systems have the disadvantages of transmitting a relatively wide beam of energy and of having limitations as to operating range. For passive angle tracking without transmission of energy, infrared detection devices are conventionally utilized in an arrangement for scanning or lobing of the field of view. These infrared arrangements which only operate over a limited frequency band, are relatively complex and normally have limited operating ranges. Also, conventional infrared detectors have a slow response to received signals so as to be undesirable for detecting short pulses of energy. A system that angle tracks objects by processing optical energy which may be transmitted to an object with very narrow beam widths, would be advantageous because of reliability and a minimum of complexity and because of the capability of operating over very large ranges such as for tracking objects in space. For example, an optical tracking system would be advantageous for missile or aircraft tracking from the earth, satellite tracking from the earth or for satellite tracking from another satellite.

It is therefore an object of this invention to provide a highly reliable angle tracking system responsive to optical energy.

It is another object of this invention to provide a tracking system that is capable of operating at any predetermined wavelength band of optical energy.

It is still another object of this invention to provide an optical type tracking system that operates without scanning or lobing of the field of view.

It is a further object of this invention to provide an optical tracking system that has a minimum of complex components and is light in weight.

It is a still further object of this invention to provide a tracking system that is reliably operable in response to short pulses of optical energy developed by devices such as lasers.

The optical angle tracking system in accordance with the principles of the invention utilizes an energy division arrangement such as a partially reflective element that varies in reflectivity and inversely in transmissivity of optical energy applied along a length thereof, which reflected and transmitted energy are separately detected to provide signals representative of the position of the source of energy. The received energy is collected by an optical focusing device and the reflective element is located substantially at the image plane thereof. The lateral position of the energy striking the reflective element is representative of the angle from which the energy is received. A single variable reflectivity e'ement provides for angular tracking, in a single dimension, of an object in space. The use of a plurality of reflectivity type elements allows angular tracking of an object in space in two dimensions.

The novel features of this invention, as well as the invention itself, both as to its organization and method of operation, will best be understood from the accompanying description, taken in connection with the accompanying drawings in which:

FIG. 1 is a schematic partially perspective structural and block diagram of a one-dimensional tracking system for tracking an object in space in accordance with the principles of the invention and including a single variable reflectivity mirror element;

FIG. 2 is a graph of reflectivity and transmissivity versus distance along the mirror element of FIG. 1 for explaining the operation thereof;

FIG. 5 is a partially perspective structural and schematic diagram of a variable optical beam splitter.

Figure 3:
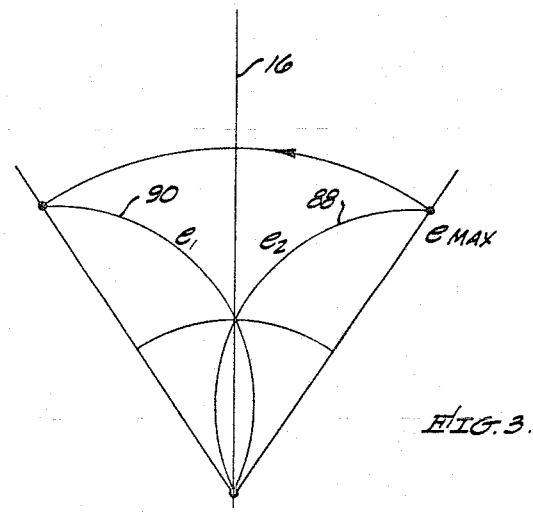
FIG. 3 is a polar beam pattern developed by the system of FIG. 1 showing the sensitivity to energy as a function of the angle of energy reception relative to the optical tracking axis.

Referring first to FIG. 1, the one-dimensional tracking system in accordance with the invention responds to energy received from an objects such as 12 shown at a position 11. The object 12 may have alternate positions such as 10 and 14 varying in angular position in an X direction or dimension from an optical tracking axis 16. The energy received from the object 12 in some arrangements is transmitted from a transmitter 33 which may be a suitable pulsed or continuous laser, for example. A schematic representation of a suitable laser transmitter is shown in FIG. 5 on page 228 of the publication entitled, "Lasers and Applications," edited by W. S. C. Chang of the Engineering Experiment Station, Ohio State University, Columbus, Ohio. The X direction for some tracking systems may be an indication of az'muth, for example. The system of the invention may operate in response to energy received in a predetermined band selected within a large spectral range which may be considered the optical range from the lower ultraviolet to the upper infrared frequency such as between 0.3 and 30 microns of wavelength. Also, the received energy utilized by the system for tracking control may vary over a relatively large frequency or wavelength band as determined by the detecting arrangement, while providing reliable operation. An optical or telescopic system 18 is provided to focus the received rays into an image plane 25 substantially on the surface of an energy division element such as a variable reflectivity element or mirror 20, and may include any conventional lense arrangement. For purposes of explanation, a double convex lense 24 is shown having a transverse axis substantially orthogonal to the tracking axis 16. Energy beams 13, 15 and 17 are received from the object 12 at respective positions 10, 11 and 14, which position are at the respective upper limit, the center and the lower limit of the field of view as determined by the optical system 18. The beams 13, 15 and 17 are focused by the lense 24 and transmitted as respective beams 31, 34 and 35 to the mirror 29. It is to be noted that the rays of the beams 13, 15 and 17 may be substantially parallel as the range to an object such as 12 or the distance from the object to the optical device 18 may be very large. Also, the distance between the lense 24 and the image plane 25 at the mirror 20 is desirably as long as possible, that is, the optical device 18 has a long focal length so that the variation of the mirror 20 from the image plane has a small effect on the area of the focused energy.

Portions of the energy applied to the mirror 20, depending on the position of energy impingement thereon, are reflected to a first detector 26 and transmitted to a second detector 30 which respectively form voltage signals, $e_1$ and $e_2$, for example, of waveforms 29 and 32 which in turn are applied through leads 36 and 38 to a suitable processor 42. In response to the signals of the waveforms 29 and 32, the processor 42 develops an error signal X' which is applied to an output lead 43 having an amplitude representative of an angle γ of the object 12 relative to the tracking axis 16. For purposes of explanation, an angle θ is also shown relating the angular position of the object 12 to the upper limit of the field of view. Thus, the angular position of the object 12 at a position such as 14 from the optical tracking axis 16 is represented by the error signal X', which signal may be applied to a suitable tracking servo mechanism to move the optical axis 16. Also, the error signal X' may be applied to a suitable display device, for example. If range gating is utilized, a conventional range gate system may be included in the processor 42 responsive to timing signals applied thereto through a lead 37 from the transmitter 33. In a passive system, the energy may be received from a source of optical energy at the object 12 or received from energy reflected by the object 12 without utilizing the transmitter 33. The detectors 26 and 30 may operate in response to optical energy over a selected bandwith. If it is desired to limit the bandwidth of operation, suitable optical filter arrangements may be positioned at appropriate points in the optical path. Electrical filters may also be included in the leads 36 and 38, if necessary.

The mirror 20 which is partially reflective and partially transmissive increases in reflectivity substantially linearly with a distance $x$ along the length $l$ from an edge 19 to an edge 21 and decreases in transmissivity substantially linearly with the distance $x$ along the length $l$. The reflectivity and transmissivity properties of the mirror 20 along the width parallel to an edge 39 are similar at any one value of $x$. As shown by a curve 44 of FIG. 2, the reflectivity $r$ may increase substantially linearly with the distance $x$ at which the optical energy is focused on the surface of the mirror 20 and the transmissivity $t$ decreases substantially linearly with the distance $x$ as shown by a waveform 46. At the edge 19 of the mirror 20 with $x$ equal to zero, the reflectivity is zero and all of the energy received in an image area 49 is transmitted to the second detector 30 as shown by a beam 50. A beam 51 is shown to indicate that a portion of the energy is reflected to the detector 26 when the energy beam strikes the mirror 23 at an increased value of $x$. When the focused energy of the beam 35 strikes the mirror 20 at the other edge 21 when $x=l$, all of the energy is reflected to the first detector 26 as shown by a beam 55. A beam 53 is shown to indicate that a portion of the energy is transmitted to the detector 30 when the energy of the beam 35 strikes the mirror 20 at a decreasing value of $x$. The energy of the beam 34 striking the mirror 20 at $x$ equal to substantially one half of the length $l$ may divide so that half of the energy is reflected to the detector 26 in a beam 57 and half of the energy is transmitted to the detector 30 in a beam 59.

The mirror 20 may be formed, for example, with a suitable surface layer 23 of reflective material such as silver, aluminum or gold deposited with an increasing thickness from the edge 19 to the edge 21. For example, the vaporized metal layer 23 may be deposited through a slit formed in a suitable frame that moves across the surface of the mirror 20 with a decreasing velocity. The reflectivity may vary by known or predetermined functions of thickness of the deposited metal. Another method of forming the mirror 20 in accordance with the principles of the invention is to deposit a suitable metal such as silver, aluminum or gold on the surface thereof with substantially equal thickness and selectively removing the metal to form the layer 23 as a grating of elongated rectangular strips extending parallel to the edges 19 and 21. If $x'$ is the width of the silvered rectangle in the $x$ direction and $x''$ is the width of the unsilvered rectangle in the same direction, the effective reflectivity at any position along the length $l$ is substantially equal to $$\frac{x'}{x'+x''}$$

Thus the mirror 20 may be developed having the characteristics of the curves 44 and 46 of FIG. 2. Although a mirror element has some absorption losses, that is, all energy is not either reflected or transmitted, these losses in well designed mirrors or energy division arrangements are not sufficient to substantially affect the reliable operation of the system in accordance with the invention. It is to be noted that any suitable energy division or beam splitting arrangement may be utilized for the element 20 in accordance with the principles of the invention.

Another arrangement that may be utilized instead of the mirror 20 for the variable reflectivity device instead of a partially coated mirror is a beam splitter arrangement as shown in FIG. 5. The reflective prisms 62 and 64 are positioned with their large surfaces adjacent to each other and with the separation 66 between the two surfaces of the prisms from one edge to the other adjusted to vary from zero to one wavelength, for example. This type of arrangement which is described in an article entitled, "A Continuously Variable Optical Beam Splitter and Intensity Controller," by N. J. Harrick at page 1203 of "Applied Optics," November 1963, may have the advantage of very low absorption losses. A beam splitter of this type may be utilized in the system of FIG. 1 or in other systems in accordance with the principles of the invention. It is to be noted that any variable reflectivity device or system having a determinable variation with position in a specific direction may be utilized in the system of the invention. Also, if the reflectivity function varies in a non-linear manner with position such as $x$ across the mirror 20, the processor 42 may be designed to properly respond to this type of variation for reliable operation in accordance with the invention.

The detectors 26 and 30 may be any suitable arrangement such as non image forming detectors, that is, photoemissive detectors that respond to photons of energy arriving from any portion of the field of view and operate without a scanning beam. The detectors preferably are of a type that are uniformly sensitive to energy received across a surface of a predetermined area. The detectors 26 and 30 may, for example, be photomultiplier tubes, or infrared cells having substantially uniform sensitivity over the surface thereof. The operating bandwidth of the detectors may substantially determine the spectral band at which the system operates. For example, a photomultiplier tube is responsive in a wavelength range from near the infrared band to the ultraviolet band. As discussed previously, filter arrangements may be included in the system if it is desired to exclude the effect of signals at certain wavelengths.

In operation, an energy beam such as 31, 34 or 35 is essentially focused on the surface 23 from the object 12 which may respectively be at positions such as 10, 11 and 14. The transmitter 33 may apply a trigger signal to the processor 42 for range gating if several objects are within the field of view and at different ranges from an object such as 12 being tracked. It is to be again noted that the system also tracks an object passively, that is, when the object emits light or optical energy or reflects light or optical energy intercepted from some other source. A general expression for the amplitude of the voltage signals $e_1$ and $e_2$ developed by the respective detectors 26 and 30 is:

$$e_1 = R(x) K P_{in} \quad (1)$$
$$e_2 = [1 - R(x)] K P_{in} \quad (2)$$

where $R(x)$ = reflectivity as a function of the distance $x$;
$K$ = a constant which includes optical and detective properties of the system;
$P_{in}$ = total input power applied to the mirror 20.

Thus the position $x$ as well as the position along the image plane 25 is determined independently of the total energy received from the source 12. Both reflected and transmitted energy must be determined by the respective detectors 26 and 30 so that a comparison with total energy may be performed by the processor 42 which responds to the voltages having values in accordance with Equations 1 and 2. In a more specific form the position of an incoming collimated beam of energy may be determined from the detected voltages $e_1$ and $e_2$ from the following expression:

$$\frac{X}{l} = \frac{l_1}{l_1 + l_2} \qquad (3)$$

This Equation 3 is based on the mirror 20 having the linear reflectivity and transmissivity functions shown in FIG. 2 and the field of view is assigned X coordinate values from $o$ to $l$, that is, between the positions 10 and 14. Although Equations 1, 2 and 3 are based on the percentage of reflected energy, the processor 42 may also determine the angular position on a basis of the percentage of transmitted energy in accordance with the principles of the invention.

Also in accordance with the invention, the reflectivity of the mirror 20 may be selected to vary over different ranges such as from 0 to 0.66 between the edges 19 and 21, and Equation 3 may be appropriately modified. The processor 42 which may be an analogue arrangement of proportional resistors to solve Equation 3, applies a signal to the output lead 43 having a value $X'$ representative of the angular location of the object such as 12 in the X direction or coordinate. The processor 42 is of the type well known in the art. For example, a processor mechanization that solves Equation 3 could utilize the summation circuit shown in FIG. 2.16C on page 21 of the publication, "Analog Methods Computation and Simulation," McGraw-Hill Book Co., New York, to form the term $e_1 + e_2$. The division of the detected voltage $e_1$ by this summation term $e_1 + e_2$ may be performed by a circuit such as that shown in FIG. 3.17, page 65, of this same analog methods publication. The signal on the lead 43 may be utilized to control a conventional display such as a cathode ray tube or may be utilized to control a conventional tracking mechanism so that the tracking axis 16 follows or is continuously directed to the selected object such as 12. As the distance $x$ increases in value, the signal $X'$ on the lead 43 may increase in amplitude indicating that the object 12 is at a position varying from the position 10 to the position 14 in the X coordinate direction, that is, the angle $\theta$ is increasing. A predetermined voltage level of the signal developed by the processor 42 may indicate that the tracking axis 16 is directed to the object 12 at the position 11. Also, if it is desired to utilize a signal referenced to zero volts along the axis 16, positive and negative values of the signal $X'$ may represent the angle $\gamma$ off of the axis 16.

The radius of an image formed on the mirror 20 such as the image 49 formed by the beam 31 is a function of the optical parameters such as the diameter of the lense 24 and the focal length between the lense 24 and the image plane 25 as well as being a function of the angle $\alpha$ and the length $l$ of the mirror 20. Because the focal length may be made relatively long and the length $l$ relatively small, the radius of the image 49 can be relatively small near the edges 19 and 21. The beam 34 may be selected to strike the surface of the mirror 20 at the image plane 25 so as to be substantially focused thereat. The angle $\alpha$ may be selected to be relatively large by properly positioning the detector 26. Thus, a relatively high degree of angular accuracy is provided by the system of the invention. The field of view of the system, that is, the length X in space at any range or the corresponding angle $\theta$ or 8 and $-\gamma$ over which received energy is processed, may be controlled by appropriate design of the focal length of the optical system 18 and the length $l$ and angle $\alpha$ of the mirror 20.

Referring now to FIG. 3, a polar gain pattern shows the sensitivity as a function of angle of the system of FIG. 1 responding to an object in space relative to the optical tracking axis 16. A curve 88 shows the energy received by the detector 30 and a curve 90 shows the energy received by the detector 26 from the object 12 at an angle $\theta$. The maximum limits of the curves 88 and 90 correspond to the object 12 at respective positions 10 and 14 which represent the limits of the angular field of view of the system. It is to be noted that the energy received by the detectors 26 and 30 is substantially equal when the object 12 is at the position 11 along the optical axis 16. Thus, the system of FIG. 1 tracks an object within an angle $\theta$ which is a function of the focal length of the optical system as well as the length $l$ and angle $\alpha$ of the mirror 20. In the direction orthogonal to the X direction, the angle from which energy is received is determined principally by the optical system and by the width of the mirror 20 along the edge 39.

Figure 4:
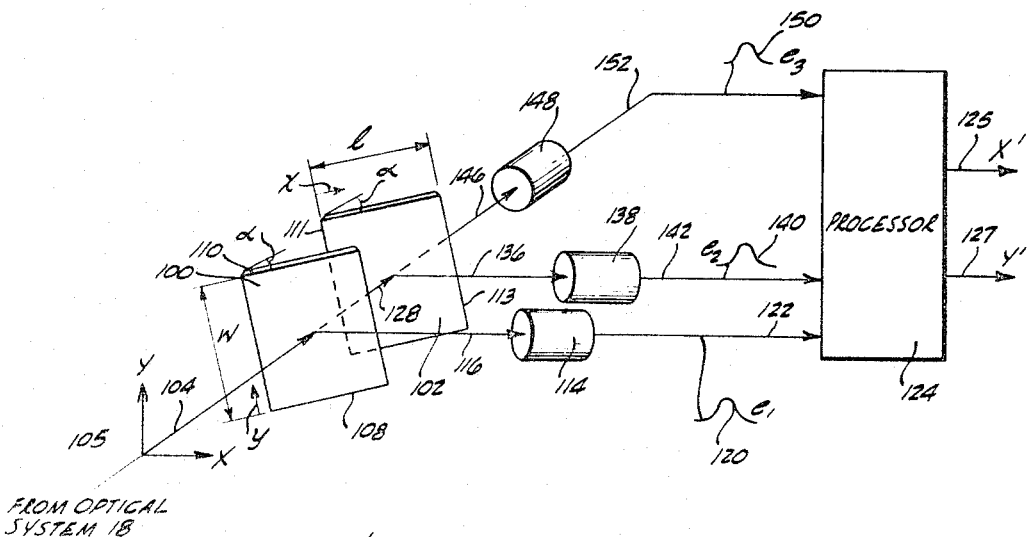
FIG. 4 is a schematic partially perspective structural and block diagram of a two-dimensional system for tracking an object in space in accordance with the principles of the invention.

Referring now to FIG. 4, an arrangement is shown in accordance with the principles of the invention, utilizing an additional mirror device and detector so that a three beam spatial pattern may be obtained to allow tracking of a point object or target in space, that is, in two dimensions or with orthogonal X–Y coordinates. First and second variable reflectivity devices 100 and 102 which may be mirrors similar to the mirror 20 of FIG. 1 are positioned at angles $\alpha$ of 45 degrees relative to an optical axis 105. A light beam 104 may be received from the optical system 18 of FIG. 1, for example. It is to be noted that the mirror devices 100 and 102 may be any suitable energy division arrangement as discussed relative to FIG. 1. The first mirror 100 has a reflectivity that varies from an edge 108 to an edge 110 with an increasing reflectivity and a decreasing transmissivity, both of which may vary in a substantially linear manner. In order that a substantial portion of the energy is always transmitted to the mirror 102 for detection in the X plane, that is, even when the beam 104 strikes the mirror 100 at or near the edge 110, the reflectivity may be selected to increase between the edges 108 and 110 from 0 to $\frac{2}{3}$. The reflectivity of the mirror 102 may vary substantially linearly between zero and unity or total reflectivity between an edge 111 and an edge 113 as described relative to FIG. 2. In the directions parallel to the edges 108 and 110 the reflectivity and transmissivity are substantially the same at any distance $y$ along the length $w$. Similarly, in the directions parallel to the edges 111 and 113, the reflectivity and transmissivity are substantially the same at any distance $x$ along the length $l$. The mirror elements 100 and 102 are positioned near to the image plane such as the image plane 25 of the optical device 18 of FIG. 1. A first detector 114 is provided to respond the reflected energy beam such as 116 to apply a voltage signal $e_1$ of a waveform 120 through a lead 122 to a processor 124.

The position along the mirror 20 of the energy transmitted therethrough as shown by a beam 128 is a function of the angular position of the source in the X coordinate direction. The energy reflected from the mirror 102 as shown by a beam 136 is received by a second detector 138 which applies a signal $e_2$ of a waveform 140 through a lead 142 to the processor 124. The energy transmitted through the mirror 102 as shown by a beam 146 is received by a third detector 148 which develops a signal $e_1$ of a waveform 150 that is applied through a lead 152 to the processor 124. It is to be noted that when the reflectivity of the mirrors 100 and 102, respectively vary from 0 to two-thirds of total reflectivity and from 0 to full reflectivity along the respective distances $w$ and $l$, the levels of energy received from an object on the optical axis 105 by the detectors 114, 138 and 148 are substantially equal and the signals of the waveforms 120, 140 and 150 may be of substantially equal voltage or current amplitudes.

The relation of the voltage signals developed by the detectors 114, 138 and 148 may be generally expressed as follows:

$$e_1 = KP_{in}f_1(y) \quad (4)$$
$$e_2 = KP_{in}[1-f_1(y)]f_2(x) \quad (5)$$
$$e_3 = KP_{in}[1-f_1(y)][1-f_2(x)] \quad (6)$$

where $K$ = a constant as determined by the optical parameters of the system and by the characteristics of the detectors;

$P_{in}$ = the optical power or energy of the beam 104;

$f_1(y)$ = the reflectivity as a function of the position $y$ along the length $w$; and $f_1(x)$ = the reflectivity as a function of the position $x$ along the length $l$.

The expressions for voltage signals given by the Equations 4, 5 and 6 provide the position of an object in space relative to the optical tracking axis 105 in terms of the characteristics and dimensions of the optical system and the mirrors 100 and 102. Thus, the processor 124 may be designed to develop X' and Y' coordinate signals on output leads 125 and 127 which represent the angular position of an object in space relative to the optical axis 105, similar to the representation in the X coordinate of the system of FIG. 1.

A specific example of the two-dimensional tracking system utilizes mirrors 100 and 102 varying in reflectivity respectively from zero to ⅔ and from 0 to unity, as discussed above. If the spatial field of view of the optical system is assigned X and Y coordinate values from zero to one thereacross, for example, the coordinates of a target may be represented by the processed detector signals as follows:

$$X' = \frac{e_2}{e_2 + e_3} \quad (7)$$

$$Y' = \tfrac{2}{3} \frac{e_1}{e_1 + e_2 + e_3} \quad (8)$$

where X' represents the horizontal position or angular position from one edge of the field of view similar to the X distance or the angle $\theta$ of FIG. 1, Y' represents the vertical position or angular position across the field of view from one edge thereof.

When an object or target appears in the center of the field of view, the conditions will be such that $X' = Y' = 0.5$ and $e_1 = e_2 = e_3$. It is to be noted that the system may also be arranged so that the signals X' and Y' have positive and negative values to represent the angle of the object from the tracking axis 105 similar to that discussed relative to FIG. 1. It is to be noted also that the signals X' and Y' applied to the respective leads 125 and 127 are related to the angle of an object in the X and Y coordinates and to $x$ and $y$ by determinable functions which appropriately include the angle $\alpha$ of the mirrors 100 and 102. A processor such as 124 to solve Equations 7 and 8 may be an analogue type device having proportional resistance arrangements, the design and construction of which is well within the skill of the art.

Although the mirrors 100 and 102 are shown in FIG. 4 positioned an angle of 45 degrees relative to the axis 105, other arrangements may be utilized in accordance with the invention. For example, the mirror 100 may be at an angle of 60 degrees from a plane orthogonal to the axis 105 and the mirror 102 may be at an angle at 60 degrees relative to the plane of the mirror 100. Thus, energy is reflected from the surface of the mirror 102 parallel to the surface of the mirror 100 and all reflected energy is applied to properly positioned detectors. This arrangement has the advantage that the angle $\alpha$ of FIG. 4 is only 30 degrees and the region or area of impingement of a light beam, as caused by variation from the image plane, is decreased to provide even higher angular accuracy of objects being tracked. The detectors 114, 138 and 148 may be of types similar to the detectors discussed relative to FIG. 1.

The system of FIG. 4 may be range gated to cover the probable target area utilizing conventional range gating systems synchronized with a transmitter as discussed relative to FIG. 1. A range accuracy as small as ±50 feet for a bandwidth of 10 megacycles of optical wavelengths and a transmitted pulse width of 0.1 microsecond, may be provided while tracking an object in space. The system provides reliable tracking as well as range determination while utilizing pulsed energy from a laser, for example, which pulses may have a relatively short time duration. Also the system in accordance with the invention is equally reliable in response to continuously transmitted energy. The tracking system may operate in response to energy received from an object over any selected bandwidth within the optical wavelength range.

Thus, there has been described an optical tracking system that operates in the visible, infrared and ultraviolet wavelengths, that is, in the optical range at which wavelengths, a beam of a narrow width may be transmitted. Because of the high sensitivity, the system may be utilized to respond to very short pulses of energy as well as continuously received energy. The system operates over very long ranges with a relatively simple and light structural arrangement and without requiring a scanning or lobing operation.

What is claimed is:

1. An angle determining device comprising
    a source of energy,
    means for focusing said energy at an image plane and having an axis,
    means substantially at said image plane and having a variable reflectivity and transmissivity of energy received substantially along said image plane,
    and means responsive to the transmitted and reflected energy to determine the angle of said source of energy relative to said axis.

2. A device for determining the position along first and second coordinates of an object in space in response to energy received therefrom comprising
    first means having a variable reflectivity and transmissivity of said energy in the direction of said first coordinate as a function of said position,
    second means having a variable reflectivity and transmissivity in the direction of said second coordinate of the energy transmitted through said first means,
    means responsive to the energy from said object for transmitting said energy to said first and second means,
    and means for determining the position of said object as a function of the reflected energy of said first means and the reflected and transmitted energy of said second means.

3. A system for angle tracking a source of optical energy in space comprising
    optical means responsive to the optical energy for focusing said energy at an image plane,
    a mirror positioned substantially at said image plane and having a reflectivity and transmissivity of the energy applied thereto respectively increasing and decreasing substantially linearly in a selected direction thereacross,
    first and second detectors respectively responsive to the reflected and transmitted energy,
    and processing means coupled to said first and second detectors for comparing the reflected energy to the total energy received by the mirror for developing signals representative of the angular position of the source of optical energy.

4. A system for determining the angular position along first and second orthogonal coordinates of a source of energy in space relative to a tracking axis comprising
    focusing means positioned along said axis for focusing the energy from said source at an image plane,
    first and second mirrors positioned substantially at said image plane, said first mirror varying in reflectivity and transmissivity in the direction of said first orthogonal coordinate in response to the energy from said source, said second mirror varying in reflectivity and transmissivity in the direction of said second orthogonal coordinate, in response to energy transmitted through said first mirror, a first detector responsive to the reflected energy from said first mirror, a second detector responsive to the reflected energy from said second mirror, a third detector responsive to the transmitted energy from said second mirror, and processing means coupled to said first, second and third detectors for developing signals representative of the angular position of said source along said first and second coordinates.

5. A system for angle tracking a source of energy in space having first and second orthogonal coordinates relative to a tracking axis comprising focusing means positioned along said tracking axis for focusing the energy from said source at an image plane, a first mirror positioned substantially at said image plane and having a reflectivity and transmissivity of the energy applied thereto respectively increasing and decreasing substantially linearly in the direction of said first orthogonal coordinate, a second mirror positioned at said image plane to receive the transmitted energy from said first mirror and having a reflectivity and transmissivity of the received energy respectively increasing and decreasing substantially linearly in the direction of said second orthogonal coordinate, a first detector responsive to the reflected energy from said first mirror, a second detector responsive to the reflected energy from said second mirror, a third detector responsive to the transmitted energy from said second mirror, and processing means coupled to said first, second and third detectors for developing signals representative of the angular position of said source along said first and second coordinates.

References Cited by the Examiner

UNITED STATES PATENTS

| | | | |
|---|---|---|---|
| 1,985,044 | 12/1934 | Lyle | 250—229 X |
| 2,945,132 | 7/1960 | Schuch | 250—216 X |
| 2,993,997 | 7/1961 | McFarlane | 250—203 |
| 3,084,261 | 4/1963 | Wilson | 88—1 |

FOREIGN PATENTS 201,087   11/1922   Great Britain.

WALTER STOLWEIN, *Primary Examiner.*

UNITED STATES PATENT OFFICE
CERTIFICATE OF CORRECTION

Patent No. 3,320,424                        May 16, 1967

Gaylord Gene Olson et al.

It is hereby certified that error appears in the above numbered patent requiring correction and that the said Letters Patent should read as corrected below.

Column 5, lines 14 and 15 the equation should appear as shown below instead of as in the patent:

$$\frac{x}{\ell} = \frac{e_1}{e_1 + e_2} .$$

same column 5, line 74, for "8" read -- $\gamma$ --.

Signed and sealed this 16th day of July 1968.

(SEAL)
Attest:

Edward M. Fletcher, Jr.                      EDWARD J. BRENNER
Attesting Officer                           Commissioner of Patents